United States Patent [19]

Unseld et al.

[11] Patent Number: 5,665,298

[45] Date of Patent: Sep. 9, 1997

[54] METHOD FOR THE MANUFACTURE OF PNEUMATIC VEHICLE TIRES USING MICROWAVE ENERGY

[75] Inventors: Klaus Unseld, Hanau; Manfred Gerresheim, Obertshausen, both of Germany

[73] Assignee: SP Reinfenwerke GmbH, Hanau, Germany

[21] Appl. No.: 364,038

[22] Filed: Dec. 27, 1994

[30] Foreign Application Priority Data

Jan. 4, 1994 [DE] Germany .................. 44 00 092.8

[51] Int. Cl.$^6$ .................................................. B29C 35/08
[52] U.S. Cl. .................. 264/402; 219/682; 264/489;
   264/490; 264/326; 425/174.8 E; 425/41
[58] Field of Search .................. 264/85, 315, 326,
   264/489, 490, 402, 403, 327; 425/174.4,
   174.8 R, 174.8 G, 41; 156/96, 275.1, 275.5,
   379.6; 219/678, 679, 682, 681, 690, 691

[56] References Cited

U.S. PATENT DOCUMENTS

| | | | |
|---|---|---|---|
| 2,495,170 | 1/1950 | Kinn | 219/682 |
| 2,618,812 | 11/1952 | Hulswit, Jr. et al. | 264/327 |
| 2,738,406 | 3/1956 | Zaleski . | |
| 4,157,464 | 6/1979 | Smith et al. | 425/174.4 |
| 4,208,562 | 6/1980 | Perreault . | |
| 4,323,745 | 4/1982 | Berggren | 264/489 |
| 4,456,806 | 6/1984 | Arimatsu | 425/174.8 E |
| 4,481,159 | 11/1984 | Itoh . | |
| 4,536,242 | 8/1985 | Gripenholt et la. | 156/96 |
| 4,699,578 | 10/1987 | Sumner et al. | 264/315 |
| 5,486,319 | 1/1996 | Stone et al. | 264/326 |

FOREIGN PATENT DOCUMENTS

| | | | |
|---|---|---|---|
| 0233846 | 8/1987 | European Pat. Off. . | |
| 0571802 | 5/1993 | European Pat. Off. . | |
| 0620130 | 4/1994 | European Pat. Off. . | |
| 2562833 | 4/1984 | France . | |
| 2669557 | 11/1990 | France . | |
| 3308820 | 9/1984 | Germany | 425/41 |
| 3426091 | 1/1986 | Germany | 264/326 |
| 58-24430 | 2/1983 | Japan | 264/25 |
| 59-114042 | 6/1984 | Japan . | |
| 2-223409 | 9/1990 | Japan | 264/326 |
| 538540 | 6/1985 | U.S.S.R. . | |
| 1326433 | 7/1987 | U.S.S.R. . | |
| 759001 | 10/1956 | United Kingdom . | |

OTHER PUBLICATIONS

"Lightweight pneumatic tyre—with bead . . . tensile modulus etc.", Dstbase WPI, Week 9225, Derwent Publications Ltd., London, GB; AN 92–20443 & JP–A–4 133 807 (Yoyo Rubber Ind.) May 7, 1992 (Abstract).

*Primary Examiner*—Mathieu D. Vargot
*Attorney, Agent, or Firm*—Birch, Stewart, Kolasch & Birch, LLP

[57] ABSTRACT

A method for the manufacture of pneumatic vehicle tires with a carcass extending between two bead rings and a breaker disposed between carcass and tread is described in which a tire blank is built up making exclusive use of non-metallic components and at least a part of the thermal energy required in the course of the vulcanization and shaping, which take place under the action of heat and pressure, is introduced into the tire in the form of microwave energy.

23 Claims, 1 Drawing Sheet

METHOD FOR THE MANUFACTURE OF PNEUMATIC VEHICLE TIRES USING MICROWAVE ENERGY

The invention relates to a method for the manufacture of pneumatic vehicle tires with a carcass extending between two bead rings and a breaker arranged between a carcass and a tread.

SUMMARY OF THE INVENTION

Pneumatic vehicle tires are normally manufactured using bead rings of steel cord and, at least in the case of radial ply tires, using metallic breaker inserts.

In connection with the retreading of vehicle tires, it is also already known to provide a non-vulcanized layer of connection rubber between an already vulcanized tread ring and the carcass, to vulcanize this connecting layer by means of microwave energy, and thus to permanently bond the tread strip to the tire.

It is a object of the invention to provide a method which makes it possible, on the one hand, to reduce the overall weight of pneumatic vehicle tires without penalties with regard to the respective tire characteristics which are aimed at, and, on the other hand, to substantially improve the economy of the method of manufacturing such tires. This object is satisfied in accordance with the invention essentially in that microwave radiation is introduced into a conventional tire heating press and the heating mould, which is in particular formed from metal, is used as a microwave reflector or as a microwave container.

Through the avoidance of metallic components there results not only a substantial saving in weight, but rather above all the precondition is satisfied that microwave energy can be used in a pneumatic vehicle tire in the course of the process of vulcanizing the tire blank, with the overall heating time being substantially reduced and in the ideal case reaching a situation in which the heating time substantially corresponds to the building time of the tire. This then has in turn the consequence that the number of the tires manufactured per mould is substantially increased, or can be substantially fewer moulds or that for a certain quantity of production that space saving is also achieved in the respective factory.

Through the use of microwave energy, and the reaction which is thereby brought about between the rubber mixture and the other non-metallic tire components, particularly advantageous bonding conditions can be achieved.

It has been found that the use of ceramic material for a heating mould which can be heated at least partly by microwave energy is particularly advantageous, since the ceramic material can be so selected that the heated mould is either not heated or is heated in a desired and defined manner on being subjected to microwaves, with it in particular being possible to build up the heating mould from different ceramic materials which each having different heating up properties so that the introduction of thermal energy into the tire to be vulcanized or into corresponding regions of the tire to be vulcanized can be predetermined.

Furthermore, it is of advantage for specific applications to combine ceramic materials with other materials, for example metals, plastics or alloys and this combination can be selected such that either specific materials are associated with specific regions of the tire or different materials are used in layers, so that in the latter case different materials follow one another in the radial direction in the relevant heated mould.

The selection of the materials for the heated mould is made in particular taking account of the points of view that the heated mould has the desired warming up properties when subjected to microwaves and that the required pressure stability is ensured, in addition to taking account of general design viewpoints which can at least partly correspond to the customary criteria for the design of the heated mould.

A pressure container for tire vulcanization which is suitable for use with the method of the invention is so designed that it contains, on the one hand, a suitable heated mould and, on the other hand, has a membrane which is intended to act against the inner side of the blank. This membrane is pressed during the vulcanization against the inner side of the tire analogously to the conventional tire heating, with the generation of the pressure which is required taking place by means of a preferably inert gas, in particular nitrogen. During this, the advantage is obtained that when subjected to microwaves this inert gas is at least substantially not heated up and it can be ensured, through suitable choice of the typical microwave parameters, that practically no heating of the gas, or only a defined desired heating of the gas occurs. The gas, is preferably only used for pressure generation and not used in order to indirectly introduce thermal energy into the tire via heating up of the gas. The energy required for tire vulcanization is, on the contrary, introduced into the tire, or into a total system consisting of the heated mould, the tire and the membrane, directly and intentionally via microwave energy.

By suitable selection of the microwave parameters and also the nature of the coupling in it is also possible to introduce the microwave energy directly into a conventional tire heating press wherein, as a rule, the metallic heated mould serves as a microwave reflector or as a microwave container, which is in particular of advantage with nitrogen heating.

Through the layout of the press mould as a direct microwave vessel, and thus directly as a hollow microwave guide cavity, the construction of the apparatus required to realize the method of the invention is substantially simplified.

The power and/or the wave length of the microwave energy can be varied at least timewise during its supply to the tire and can preferably be interrupted timewise, so that as a result of these measures, which directly affect the tire, ideal vulcanization conditions can be provided, in particular with respect to the bonding of the non-metallic tire components.

It is also possible, in dependence on the tire components that are used, to allow microwaves of different frequency to operate simultaneously during the microwave heating during predeterminable time intervals, which can have favourable effects on the mutual bonding of the tire components.

In order to even out the introduction of energy into the tire blank it can be advantageous to move the tire when the microwave source or sources are operating, relative to the latter, in particular to rotate it, but it is also possible to vary the nature and/or the location of the coupling-in of the microwave energy during the introduction of the microwave energy, or to influence the energy distribution through optical elements and to match it to the respective tire configuration.

In accordance with a further special feature of the invention, materials which are at least substantially neutral, but which have increased microwave absorption characteristics are used in predeterminable regions of the tire blank. In this way a differentiated introduction of energy into the tire is ensured, even if the microwave itself is not differentially directed. Furthermore, it is possible to introduce such materials, which are especially of significance for the effectiveness of the microwave energy in the tire blank, into the mixture or into the mixtures intended for specific regions of the tire, and thus to allow them to become effective in the interior of the tire.

Aramides, carbon fibres, nylon, rayon and the like are preferably used as materials for the bead rings and inserts, in particular breaker inserts, which are provided in tires in accordance with the invention, without a restriction to these materials being present.

DETAILED DESCRIPTION OF THE INVENTION

Figure 1:
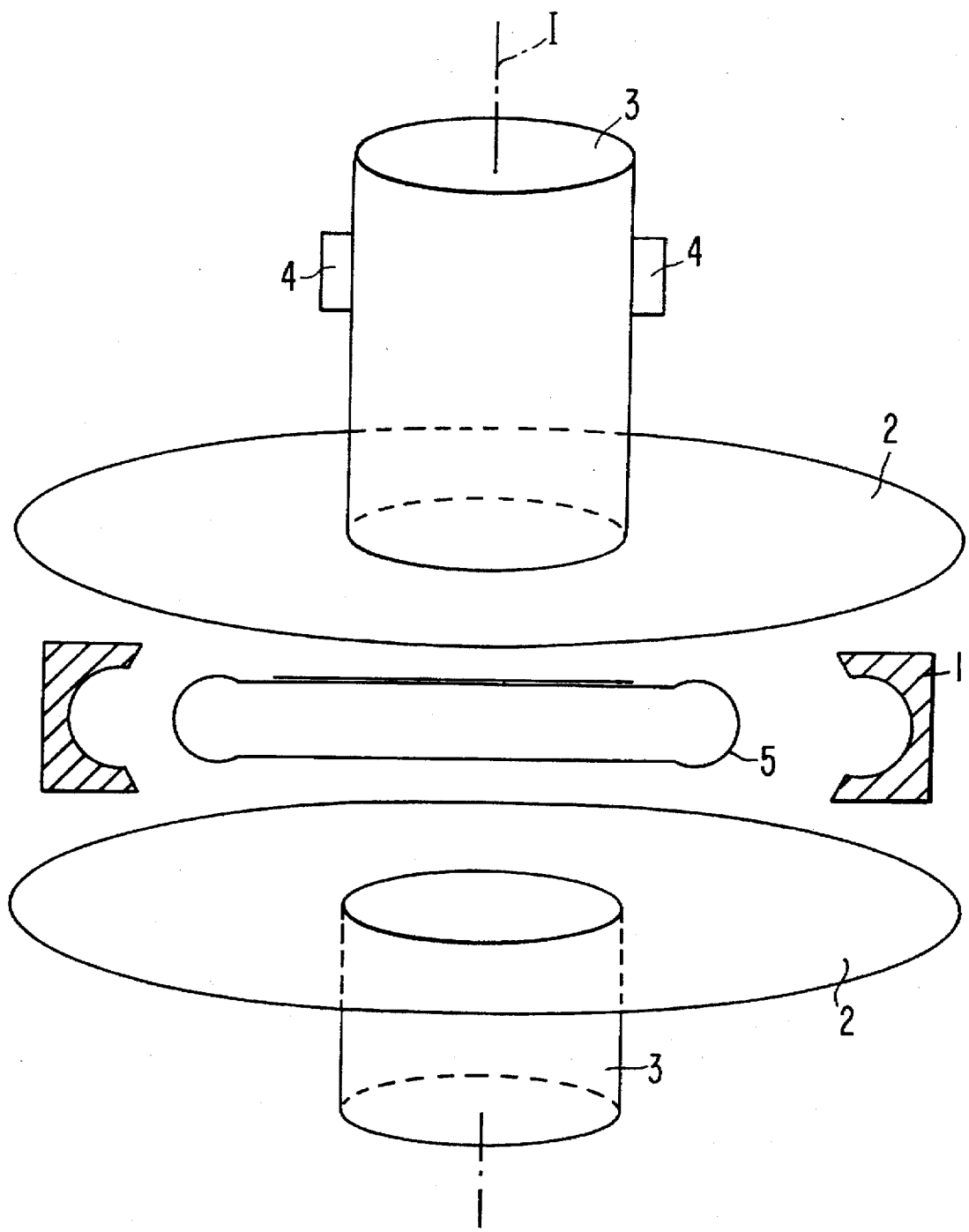
FIG. 1, shows a perspective illustration of an embodiment of an arrangement for realising the method according to the invention.

In the microwave arrangement illustrated in the drawing the tire 5 is located together with a tire heating mould 1 between two parallel circular microwave reflecting plates 2, the planes of which extend perpendicular to the axial direction of the tire. The plates 2 each have a central passage opening which are each adjoined towards the outside by a microwave wave guide 3. The microwave wave guides 3 have additional couplings in positions 4 for microwaves.

Microwaves are introduced axially into the center of the tire mould 1 via the wave guides 3 and are reflected to an fro between the parallel plates 2. An escape of the microwaves is only possible in the radial direction, with the microwaves penetrating the tire which is present in the tire mould 1 radially and transferring energy to the latter for heating.

We claim:

1. A method for the manufacture of pneumatic vehicle tires comprising a carcass extending between two bead rings and a breaker arranged between carcass and tread, wherein the respective tire blank is built up using exclusively non-metallic components and at least part of the thermal energy required in the course of vulcanization and shaping which takes place under the action of heat and pressure is introduced into the tire in the form of microwave energy generated by a microwave generation device comprising two parallel circular microwave reflecting plates, the plane of said plates being substantially perpendicular to the axial direction of said tire blank, each of said plates having a central passage opening and a wave guide for direction of generated microwaves into a space between said plates, wherein the microwave radiation is introduced into a heating mold of a tire heating press, said heating mold being disposed within the space during the vulcanization of said tire blank and being used as a microwave container.

2. The method in accordance with claim 1, wherein during the vulcanization a membrane is pressed onto the inner side of the blank, with the required pressure being generated by means of an inert gas.

3. The method in accordance with claim 1, wherein said heating mold is formed at least in part from ceramic material.

4. The method in accordance with claim 1, wherein said at least one type of material is a plurality of types of material, each of said plurality has characteristic heating properties and each of said plurality has different heating up properties on being subjected to microwaves.

5. The method in accordance with claim wherein said at least one type of material is ceramic material, said ceramic material being at least two different ceramics, selection of said at least two different ceramics taking place in such a manner that the heating mold or regions of the heating mold heat up when subjected to microwaves in a predeterminable manner.

6. The method in accordance with claim 4, wherein at least one of said plurality is ceramic material and at least one of the other of said plurality is selected from the group consisting of metal, plastic, and alloys thereof.

7. The method in accordance with claim 2, wherein the inert gas is nitrogen.

8. The method in accordance with claim 6, wherein the heating mold has a layered structure formed from the ceramic material and at least one of the other of said plurality of types of material.

9. The method in accordance with claim 1, wherein said at least one type of material is selected from a group consisting of metal, ceramic, plastic and alloys thereof.

10. A method for manufacturing pneumatic tires comprising the steps of:

assembling a tire blank to be vulcanized, said tire blank being formed of exclusively non-metallic components, assembling a heating mold for a tire vulcanization container, inserting said tire blank within said heating mold, the heating mold being a microwave container, assembling a microwave generation device comprising two parallel circular microwave reflecting plates, the plane of said plates being substantially perpendicular to the axial direction of said tire blank, each of said plates having a central passage opening and a wave guide for direction of generated microwaves into a space between said plates, inserting said tire blank within said heating mold in the space, energizing said microwave generation device for directing generated microwaves into said heating mold within the space to vulcanize the tire blank, and vulcanizing said tire blank.

11. The method in accordance with claim 10, wherein said heating mold is formed of metal.

12. The method in accordance with claim 10 comprising the further steps of:

inserting a membrane within said tire blank for pressing against an inner side thereof, and pressurizing the membrane to press against said membrane by means of an inert gas.

13. The method in accordance with claim 11 comprising the further steps of:

inserting a membrane within said tire blank for pressing against an inner side thereof, and pressurizing the membrane to press against said membrane by means of an inert gas.

14. The method in accordance with claim 10, wherein the step of assembling the heating mold includes selecting a plurality of parts from which to form the heating mold, at least a first portion of said plurality of parts being ceramic material.

15. The method in accordance with claim 10, wherein the step of assembling the heating mold includes selecting a plurality of parts from which to form the heating mold, each of the plurality of parts being formed from at least one type of material, each of said at least one type of material having characteristic heating properties including different heating up properties on being subjected to microwaves.

16. The method in accordance with claim 15, wherein the step of selecting a plurality of parts includes pre-determining the heating up properties, on being subjected to microwaves, of said at least one type of material, and the step of assembling of the heating mold includes positioning each of the plurality of parts to form the heating mold based upon the pre-determined heating up properties.

17. The method in accordance with claim 15, wherein said at least one type of material is ceramic material, said ceramic material being at least two different ceramics.

18. The method in accordance with claim 15, wherein said at least one type of material is a plurality of types of material, and at least one of said plurality of parts is formed from ceramic material and at least one of the other of said plurality of parts is formed by a material selected from the group consisting of metal, plastic, and alloys thereof.

19. The method in accordance with claim 15, wherein said heating mold has a layered structure formed from the ceramic material and at least one of the other of said plurality of types of material selected from the group consisting of metal, plastic, and alloys thereof.

20. The method in accordance with claim 10, wherein the inert gas is nitrogen.

21. The method in accordance with claim 14, wherein a second portion of said plurality of parts is formed of a material selected from a group consisting of metal, ceramic, plastic and alloys thereof.

22. A method for the manufacture of pneumatic vehicle tires comprising a carcass extending between two bead rings and a breaker arranged between carcass and tread, wherein the respective tire blank is built up using exclusively non-metallic components and then vulcanized, and wherein at least part of the thermal energy required in the course of vulcanization and shaping which takes place under the action of heat and pressure is introduced into the tire disposed within a heating mold of a tire heating press in the form of microwave energy, wherein said heating mold is formed of a plurality of types of material, each of said plurality of types of material having characteristic heating properties, the characteristic heating property of one of said plurality of types of material differing from the characteristic heating property of the others of said plurality of types of material upon being subjected to microwave energy.

23. The method in accordance with claim 22, wherein one of said plurality of types of material is ceramic material, said ceramic material being of at least two different ceramics, selection of said at least two different ceramics taking place in such a manner that the heating mold or regions of said heating mold heat up when subjected to microwave energy in a predeterminable manner.

* * * * *